(12) United States Patent
Lambert et al.

(10) Patent No.: US 8,176,141 B1
(45) Date of Patent: May 8, 2012

(54) SMB REQUEST PREFETCHING

(75) Inventors: Leigh Lambert, Holbrook, MA (US); Matthew Ian Hepburn, Quincy, MA (US); Peter Lepeska, Boston, MA (US)

(73) Assignee: ViaSat, Inc., Carlsbad, CA (US)

( * ) Notice: Subject to any disclaimer, the term of this patent is extended or adjusted under 35 U.S.C. 154(b) by 191 days.

(21) Appl. No.: 12/831,609

(22) Filed: Jul. 7, 2010

Related U.S. Application Data

(60) Provisional application No. 61/223,618, filed on Jul. 7, 2009.

(51) Int. Cl.
*G06F 15/167* (2006.01)
*G06F 15/16* (2006.01)
*G06F 15/173* (2006.01)
*G06F 15/177* (2006.01)

(52) U.S. Cl. ........ 709/212; 709/217; 370/230; 370/401; 370/412; 726/5

(58) Field of Classification Search .......... 709/208–219; 370/230, 401, 412; 726/5
See application file for complete search history.

(56) References Cited

U.S. PATENT DOCUMENTS

| | | | | |
|---|---|---|---|---|
| 4,543,627 | A * | 9/1985 | Schwab | 709/212 |
| 6,078,733 | A * | 6/2000 | Osborne | 709/250 |
| 6,973,493 | B1 * | 12/2005 | Slaughter et al. | 709/225 |
| 7,290,039 | B1 * | 10/2007 | Lisitsa et al. | 709/217 |
| 7,349,953 | B2 * | 3/2008 | Lisitsa et al. | 709/217 |
| 7,730,524 | B2 * | 6/2010 | Patel et al. | 726/5 |
| 7,873,060 | B2 * | 1/2011 | Luo et al. | 370/401 |
| 7,911,948 | B2 * | 3/2011 | Sebastian | 370/230.1 |
| 8,010,705 | B1 * | 8/2011 | Sebastian et al. | 709/247 |
| 8,090,241 | B2 * | 1/2012 | Rajakarunanayake et al. | 386/291 |
| 2002/0120690 | A1 * | 8/2002 | Block | 709/206 |
| 2003/0050990 | A1 * | 3/2003 | Craddock et al. | 709/212 |
| 2003/0061296 | A1 * | 3/2003 | Craddock et al. | 709/212 |
| 2005/0108354 | A1 * | 5/2005 | Lisitsa et al. | 709/212 |
| 2005/0154783 | A1 * | 7/2005 | Lisitsa et al. | 709/209 |
| 2007/0180505 | A1 * | 8/2007 | Patel et al. | 726/5 |
| 2009/0116503 | A1 * | 5/2009 | Sebastian | 370/412 |
| 2009/0276833 | A1 * | 11/2009 | Paul et al. | 726/4 |
| 2010/0098092 | A1 * | 4/2010 | Luo et al. | 370/401 |

* cited by examiner

*Primary Examiner* — Haresh N Patel
(74) *Attorney, Agent, or Firm* — Kilpatrick Townsend & Stockton LLP

(57) ABSTRACT

Systems and methods are described for accelerating a user experience involving transactions with a remote file server by identifying and prefetching simple message block (SMB) requests. Embodiments exploit applications' usage of certain SMB request offset value patterns to reliably prefetch SMB requests. Requests from a user to a remote file server are intercepted by a proxy server disposed in the communications network relatively local to the file server. When a known SMB request offset value is detected and other conditions are met, a set of other SMB request offset values is prefetched by the proxy server according to a predetermined pattern. These prefetched requests may be sent, along with the original request, in a single transaction over the communications link from the proxy server to the requesting user (e.g., via a proxy client associated with the requesting user).

18 Claims, 8 Drawing Sheets

SMB REQUEST PREFETCHING

CROSS-REFERENCES

This application claims the benefit of and is a non-provisional of co-pending U.S. Provisional Application Ser. No. 61/223,618, filed on Jul. 7, 2009, titled "METHODS AND SYSTEMS FOR IMPLEMENTING SMB OFFICE LOCK PREFETCHING," which is hereby expressly incorporated by reference in its entirety for all purposes.

BACKGROUND

Embodiments relate, in general, to network acceleration, and, more particularly, to prefetching of simple message block (SMB) requests in communications systems.

HTTP prefetching typically involves pre-requesting content on behalf of a client or browser before any request for that content is actually generated. When content is prefetched, it may become possible to satisfy the request for that content locally (with regard to the client or browser), thereby negating the need to transmit the request and wait for the response. For example, in cases where there exists high latency between the client generating the request and the server which responds with the context requested, each negated request/response may avoid the penalty for such latency, thereby potentially reducing the total time required to satisfy the entire series of requests for the client. This may result in an accelerated end user experience.

One context in which latency may affect a user's experience is when interacting with files on a remote file server. In addition to actual file content traversing a network between the local client and the remote file server, other types of traffic may be involved in the file transactions. For example, certain applications communicate multiple simple message block (SMB) locking and unlocking requests for various purposes, including revision management, read/write authorization management, protection from multiple conflicting editors, etc.

SUMMARY

Among other things, systems and methods are provided for accelerating a user experience involving transactions with a remote file server by identifying and prefetching simple message block (SMB) requests. Embodiments exploit applications' usage of certain SMB request offset value patterns to reliably prefetch SMB requests. Requests from a user to a remote file server are intercepted by a proxy server disposed in the communications network relatively local to the file server. When a known SMB request offset value is detected and other conditions are met, a set of other SMB request offset values is prefetched by the proxy server according to a predetermined pattern. These prefetched requests may be sent, along with the original request, in a single transaction over the communications link from the proxy server to the requesting user (e.g., via a proxy client associated with the requesting user).

In one set of embodiments, a method is provided for implementing simple message block (SMB) request prefetching. The method includes: monitoring, at an optimizer node of a communications system, network traffic to identify an SMB request, the network traffic comprising communications from a user system on a client side of the communications system to an addressable content location on a server side of the communications system, the optimizer node being disposed in the communications system between the user system and the content location; and, when a first SMB request is identified: analyzing the first SMB request to determine an associated request memory offset indicating a memory offset within a file affected by the first SMB request; determining whether the request memory offset matches one of a set of known memory offsets maintained by the optimizer node, each of the set of known memory offsets being associated with at least one additional memory offset previously determined as likely to be associated with a second SMB request requested by the user system within a first time threshold subsequent to the first SMB request; and when the request memory offset matches one of the set of known memory offsets maintained by the optimizer node, prefetching an SMB locking request and an SMB unlocking request, both associated with the at least one additional memory offset.

Embodiments of such a method are implemented as a machine-readable medium having stored thereon a series of instructions which, when executed by a processor, cause the processor to handle SMB request prefetching according to a set of steps.

In another set of embodiments, a system for implementing SMB request prefetching is described. The system includes a traffic monitoring subsystem, a traffic analyzer subsystem, and a prefetching subsystem. The traffic monitoring subsystem is disposed at an optimizer node of a communications system between a user system and a content server and is configured to monitor network traffic to identify an SMB request, the network traffic comprising communications from a user system on the client side to a content server on the server side. The traffic analyzer subsystem is communicatively coupled with the optimizer node, and is configured, when a first SMB request is identified, to: analyze the first SMB request to determine an associated request memory offset indicating a memory offset within a file affected by the first SMB request; and determine whether the request memory offset matches one of a set of known memory offsets maintained by the optimizer node, each of the set of known memory offsets being associated with at least one additional memory offset previously determined as likely to be associated with a second SMB request requested by the user system within a first time threshold subsequent to the first SMB request. The prefetching subsystem is communicatively coupled with the traffic analyzer subsystem, and is configured to prefetch an SMB locking request and an SMB unlocking request, both associated with the at least one additional memory offset, when the request memory offset matches one of the set of known memory offsets maintained by the optimizer node.

Other features and advantages of the present invention will be apparent to one of ordinary skill in the art upon review of the detailed description of the present invention and the included figures.

BRIEF DESCRIPTION OF THE DRAWINGS

The present disclosure is described in conjunction with the appended figures.

Figure 1:
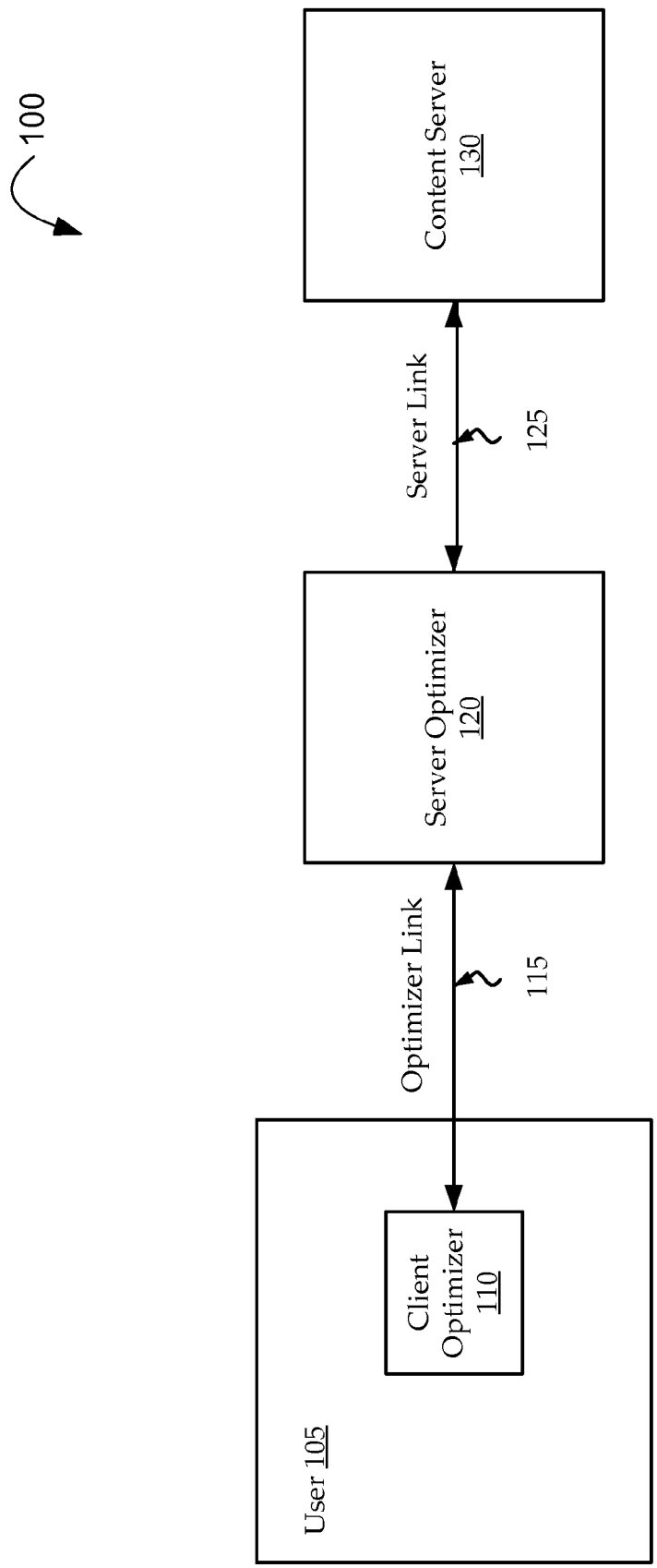
FIG. 1 shows a simplified, high-level block diagram of an illustrative communications system for use with various embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiment(s) only and is not intended to limit the scope, applicability, or configuration of the disclosure. Rather, the ensuing description of the exemplary embodiment(s) will provide those skilled in the art with an enabling description for implementing an exemplary embodiment. It should be understood that various changes may be made in the function and arrangement of elements without departing from the spirit and scope as set forth in the appended claims.

Aspects of the present invention relate to simple message block (SMB) request prefetching. In one embodiment, SMB requests in connection with Microsoft® Office™ files (e.g., a Word™ document (.doc, .docx, etc.), an Excel™ spreadsheet, a PowerPoint™ presentation, etc.) are prefetched. In general, when an Office™ file is being opened, saved, accessed, closed, etc. in a networked environment (e.g., using a remote file server), various memory offsets are locked and/or unlocked using SMB requests. This may allow various features, including maintenance of the integrity and synchronization of the file, even while multiple users across the network have access to the file.

As used herein, an SMB request is intended to include at least either or both of locking or unlocking requests. Further, while the description focuses specifically on SMB, it will be appreciated that embodiments may be used in conjunction with other similar protocols without departing from the scope of the invention. Typically, an SMB request is associated with a file identifier, and includes at least two parameters: a memory offset within the file designated by the file identifier, and 2) a number of bytes that should be locked or unlocked (e.g., a range of bytes beginning at the indicated memory offset). Certain embodiments are configured to handle SMB requests, even when communicated without one or both of those parameters.

Certain types of network traffic manifest patterns that can be exploited for prefetching purposes. In particular, when one SMB request is made, it may be highly likely that one or more particular SMB requests will subsequently be made. For example, whenever a certain file action is taken (e.g., a file open, a file close, a file save, etc.), a predictable pattern of SMB requests may occur according to the application through which the file action is being taken. As such, detecting a first SMB request in that predictable pattern may suggest a high likelihood that the other SMB requests in the pattern will subsequently be made.

Suppose that, when a document is opened using a particular application, a sequence of twenty separate SMB requests are made; ten for locking the document file at certain memory offsets, and ten for unlocking the file at the same memory offsets. Each SMB request may be very small, such that even the sequence of twenty separate requests may not consume a significant amount of bandwidth.

Certain types of communications networks may manifest relatively high latency. For example, in a satellite network, each transmission may be communicated from a ground station to a satellite and to another ground station. Because of the large distances between the ground stations and the satellite, each transmission may have a minimum round trip time (RTT) on the order of one second. If, as in the example above, a file action involves a sequence of twenty SMB requests, the end user may experience latencies on the order of twenty seconds for all the requests to be communicated and for the file action to be completed.

If, however, the first of those SMB requests is identified as a request likely to be followed in a predictable way by other requests, all the 19 subsequent SMB requests may be prefetched. While the first SMB request (e.g., the only one actually requested at the time of its receipt) may take slightly longer due to additional overhead from the prefetching, the prefetched requests ultimately may be satisfied with almost no latency. As such, rather than taking on the order of twenty seconds for all the requests to be communicated, the twenty requests may take slightly longer than one second.

Notably, the way in which SMB requests are typically implemented by certain applications may result in those SMB requests being prohibitive or otherwise undesirable for typical prefetching techniques. For example, the manner in which Office™ files are locked using SMB locking requests may frustrate typical prefetching of such locking requests. As such, network performance may be adversely affected when additional round trip times (RTTs) are used to satisfy those requests.

Embodiments exploit applications' usage of certain SMB request offset value patterns to reliably prefetch SMB requests. Requests from a user to a remote file server are intercepted by a proxy server disposed in the communications network relatively local to the file server. When a known SMB request offset value is detected and other conditions are met, a set of other SMB request offset values is prefetched by the proxy server according to a predetermined pattern. These prefetched requests may be sent, along with the original request, in a single transaction over the communications link from the proxy server to the requesting user (e.g., via a proxy client associated with the requesting user).

Turning first to FIG. 1, a simplified, high-level block diagram is shown of an illustrative communications system 100 for use with various embodiments. The communications system 100 includes a user system 105 in communication with a content server 130 (e.g., a file server). The client-server communications are optimized (e.g., accelerated) by a client optimizer 110 and a server optimizer 120. The client optimizer 110 and the server optimizer 120 are in communication over an optimizer link 115, and the server optimizer 120 is in communication with the content server 130 over a server link 125. Typically, the optimizer link 115 manifests higher latency than the server link 125. For example, the optimizer link 115 is a satellite link and the server link 125 is a high bandwidth link (e.g., a small number of hops over backhaul or similar infrastructure).

The client optimizer 110, the server optimizer 120 (e.g., and components of the optimizer link 115) may be referred to collectively as optimizer components. In some embodiments, the client optimizer 110 and the server optimizer 120 are implemented as a proxy client and a proxy server, respectively, such that the optimizer link 115 is a proxy tunnel. In other embodiments, the client optimizer 110 and the server optimizer 120 are implemented as in-line optimization components. For example, the optimizer components are configured to facilitate prefetching and/or other acceleration functionality over the communications system 100 using one or more optimizer transport protocols.

Embodiments of the user system 105 use a web browser to access various Internet and/or intranet web pages, or to access files, emails, etc. from various types of content servers, including file servers (e.g., corporate servers, "cloud" servers, etc.). Some or all communications to and/or from the user system 105 are intercepted by optimizer components so certain optimization determinations can be made. For example, the server optimizer 120 may identify, based on a request received from client optimizer 110 via the user system 105's browser, objects that may be able to be prefetched. In one embodiment, the objects that may be able to be prefetched include SMB locking and unlocking requests. Embodiments of the server optimizer 120 and/or the client optimizer 110 may store caching instructions for objects downloaded by the server optimizer 120 on behalf of the user system 105 (e.g., in one or more cache models, or the like).

Figure 2:
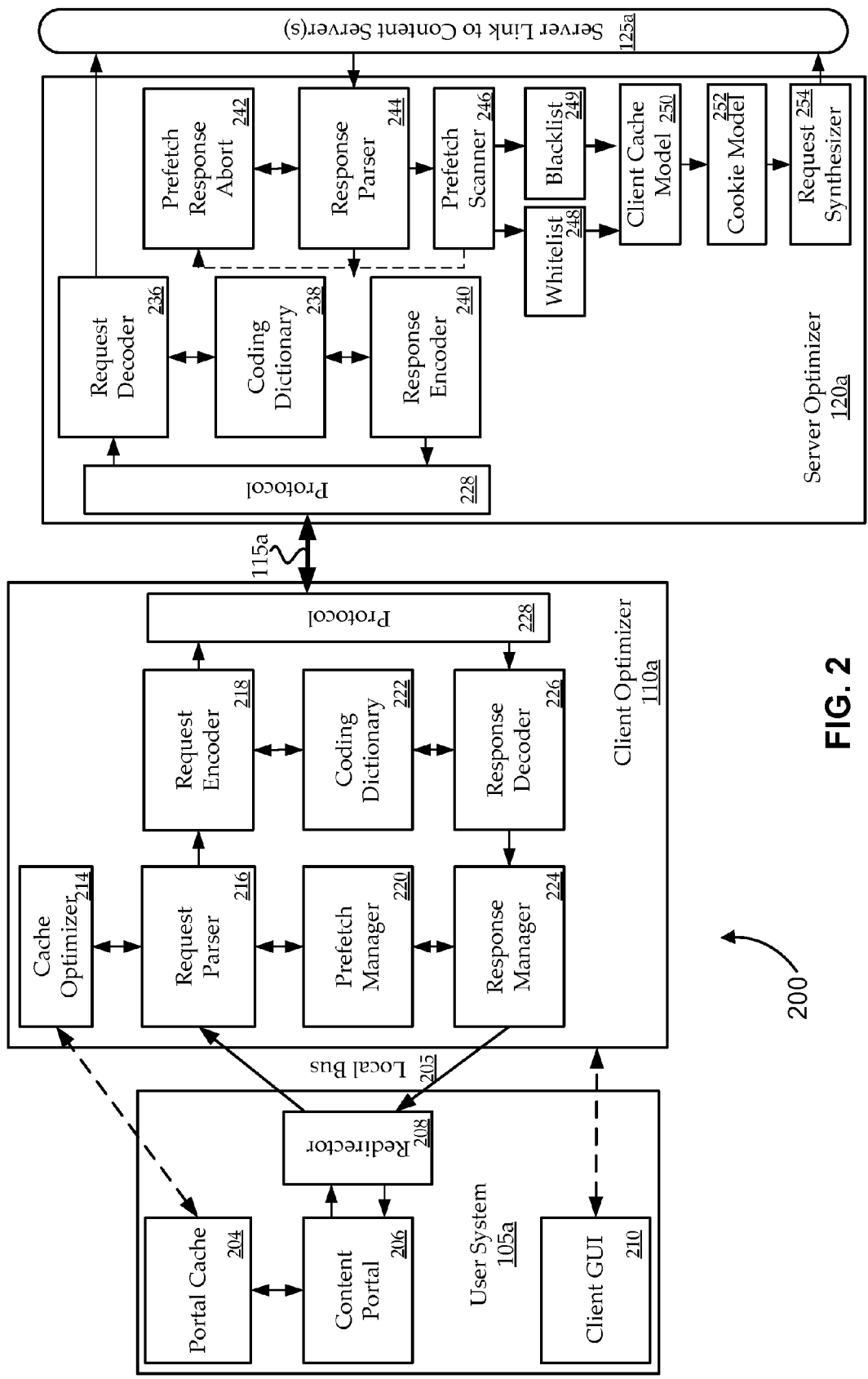
FIG. 2 shows a functional block diagram of an illustrative communications system, including a client optimizer and a server optimizer, according to various embodiments.

It will be appreciated that many variations and architectures of the communications system 100 are possible, including various embodiments of the optimizer components. FIG. 2 shows a functional block diagram of an illustrative communications system 200, including a client optimizer 110a and a server optimizer 120a, according to various embodiments. Embodiments of the communications system 200 may be implemented as the communications system 100 of FIG. 1. The system 200 includes a user system 105a, a client optimizer 110a, and a server optimizer 120a. The client optimizer 110a and the server optimizer 120a are in communication over an optimizer link 115a, and the server optimizer 120a is in communication with a content server over a server link 125a. Typically, the optimizer link 115a manifests higher latency than the server link 125a.

The user system 105a may include a client graphical user interface (GUI) 210. Client GUI 210 may allow a user to configure performance aspects of the system 200. For example, a user may adjust the compression parameters and/or algorithms, content filters (e.g., blocks elicit websites), and enable or disable various features used by the system 200. In one embodiment, some of the features may include network diagnostics, error reporting, as well as controlling, for example, prefetch response abort 242. Such control may be adding and/or removing pages (e.g., URLs) to or from whitelist 248 and/or blacklist 249.

The user interacts with remote content via a content portal 206 on the user system 105a. In one embodiment, the user selects a universal recourse locator (URL) address which directs content portal 206 (e.g., Internet Explorer®, Firefox®, Netscape Navigator®, etc.) to a website (e.g., cnn.com, google.com, yahoo.com, etc.). In another embodiment, the user transacts with a remote file server or other type of content server, for example, to open, close, modify, and/or otherwise interact with remote content via the content portal 206.

In some embodiments, content portal 206 may check portal cache 204 to determine whether requested content (e.g., the website associated with the selected URL, the file requested from the file server, etc.) is located within portal cache 204. If the content is located within portal cache 204, the amount of time the content has been in the cache is checked to determine if the cached content is "fresh" (i.e., new) enough to use. For example, the amount of time that a website may be considered fresh may be 5 minutes; however, other time limits may be used. Consequently, if the content has been cached and the website is considered fresh, then content portal 206 renders the content. However, if the content has either not been cached or the cached content is not fresh, content portal 206 sends a new request for the content.

In one embodiment, redirector 208 intercepts the request sent from content portal 206. Redirector 208 instead sends the request through a local bus 205 (e.g., or other local wired or wireless communications link) to the client optimizer 110a. In some embodiments, the client optimizer 110a is implemented as a software application running on the user system 105a. In an alternative embodiment, the client optimizer 110a is implemented on a separate computer system and is connected to user system 105a via a high speed/low latency link (e.g., a branch office LAN subnet, etc.). In one embodiment, client optimizer 110a includes a request parser 216. Request parser 216 may check cache optimizer 214 to determine if a cached copy of the requested content may still be able to be used. Cache optimizer 214 is in communication with portal cache 204 in order to have access to cached content. Cache optimizer 214 is able to access portal cache 204 without creating a redundant copy of the cached content, thus requiring less storage space.

According to one embodiment, cache optimizer 214 implements more effective algorithms to determine whether cached content is fresh. In one embodiment, cache optimizer 214 implements cache expiration algorithms from HTTP v1.1 (i.e., RFC 2616), which may not be natively supported in content portal 206. For example, portal cache 204 may inappropriately consider a cached website as too old to use; however, cache optimizer 214 may still be able to use the cached website. More efficient use of cached content can improve communications link efficiency by reducing the number of round trips.

In one embodiment, if the requested content is not able to be accessed from the cached content, request parser 216 checks prefetch manager 220 to determine if the requested content has been prefetched. Prefetching content is when content is accessed, downloaded, and stored before a request for the content is made by the user system 105a. Prefetching can potentially save round trips of data access from user system 105a to the Internet, file, and/or other content servers, etc. Particularly where the optimizer link 115a is a substantially high-latency link, a reduction in round trips may yield an appreciable improvement to a user's experience even when the prefetched files are small in file size.

In a further embodiment, if the requested content has not been prefetched, then request parser 216 forwards the request to a request encoder 218. Request encoder 218 encodes the request into a compressed version of the request using one of many possible data compression algorithms. For example, these algorithms may employ a coding dictionary 222 which stores strings so that data from previous content objects can be used to compress data from new content. The compression can save bandwidth on a connection, such as optimizer link 115a.

In one embodiment, after request encoder 218 generates an encoded version of the request, the encoded request is forwarded to a protocol 228. In one embodiment, protocol 228 is Intelligent Compression Technology's® (ICT) transport protocol (ITP). Nonetheless, other protocols may be used, such as the standard transmission control protocol (TCP). In one embodiment, ITP maintains a persistent connection with server optimizer 120a. The persistent connection between client optimizer 110a and server optimizer 120a over the optimizer link 115a enables the system 200 to eliminate some inefficiencies and overhead costs associated with creating a new connection for each request.

In one embodiment, the encoded request is forwarded from protocol 228 to request decoder 236. Request decoder 236 uses a decoder which is appropriate for the encoding performed by request encoder 218. In one embodiment, this process utilizes a coding dictionary 238 in order to translate the encoded request back into a standard format which can be accessed by the destination content location (e.g., website, content server, etc.). Furthermore, if the request (e.g., HTTP request) includes a cookie (or other special instructions), such as a "referred by" or type of encoding accepted, information about the cookie or instructions may be stored in a cookie model 252. Request decoder 236 then transmits the decoded request to the destination content location over the server link 125a. The server link 125 may include a cable modem connection, a digital subscriber line (DSL) connection, a T1 connection, a fiber optic connection, etc.

In response to the request, a response parser 244 receives a response from the requested content location. In one embodiment, this response may include an attachment, such as an image and/or text file. Some types of attachments, such as HTML, XML, CSS, or Java Scripts, may include references to other "in-line" objects that may be needed, for example, to render a requested web page. In one embodiment, when response parser 244 detects an attachment type that may contain such references to "in-line" objects, response parser 244 may forward the objects to a prefetch scanner 246.

In one embodiment, prefetch scanner 246 scans the attached file and identifies URLs (or other addressing) of in-line objects that may be candidates for prefetching. For example, candidates may be identified by HTML syntax, such as the token "img src=". In addition, objects that may be needed for the web page may also be specified in java scripts that appear within the HTML or CSS page or within a separate java script file. Methods for identifying candidates within Java scripts may be found in a co-pending U.S. patent application Ser. No. 12/172,917 entitled, "METHODS AND SYSTEMS FOR JAVA SCRIPT PARSING", which is incorporated by reference for any and all purposes.

In other embodiments, prefetch candidates are identified in other ways. For example, certain techniques can be used to determine that, when a particular type of request is intercepted from the user system 105a, other types of requests are likely to follow in the near term. In some embodiments, certain types of SMB requests are identified as trigger events that indicate a substantially high likelihood that other SMB requests will be subsequently made. Thus, these other SMB requests can be prefetched in anticipation of the subsequent requests, which may effectively accelerate the transactions over the communications system 200.

In some embodiments, identified candidates are added to a candidate list, or the like. In one embodiment, for the candidate URLs or other content addresses, prefetch scanner 246 notifies prefetch response abort 242 of the context in which the object was identified, such as the type of object in which it was found and/or the syntax in which the URL occurred. This information may be used by prefetch response abort 242 to determine the probability that the URL will actually be subsequently requested (e.g., by content portal 206).

According to a further embodiment, the candidate list is forwarded to whitelist 248 and blacklist 249. Whitelist 248 and blacklist 249 may be used to track which content addresses should be allowed to be prefetched. The determination may be based on an associated host (e.g., a server that is supplying the URL), file type (e.g., application service provider (ASP) files should not be prefetched), etc. Accordingly, whitelist 248 and blacklist 249 may control prefetching behavior by indicating which addresses on the candidate list should or should not be prefetched. In many instances with certain webpages/file types, prefetching may not work. In addition to ASP files, webpages which include fields or cookies may have problems with prefetching.

In one embodiment, once the candidate list has been passed through whitelist 248 and blacklist 249, a modified candidate list is generated and then the list is forwarded to a client cache model 250. The client cache model 250 attempts to model which items from the list will be included in portal cache 204. As such, those items are removed from the modified candidate list. Subsequently, the updated modified candidate list is forwarded to a request synthesizer 254 which creates an HTTP request in order to prefetch each item in the updated modified candidate list. The HTTP request header may include cookies and/or other instructions appropriate to the website and/or to content portal's 206 (e.g., web browser's) preferences using information obtained from cookie model 252. The prefetch HTTP requests may then be transmitted through server link 125a to the corresponding content location.

In one embodiment, response parser 244 receives a prefetch response from the content location and accesses a prefetch response abort 242. Prefetch response abort 242 is configured to determine whether the prefetched item is worth sending to user system 105a. For example, costs of prefetching may include excess system capacity used to communicate content that may not ultimately be requested, and benefits of prefetching may include round trips saved by anticipatorily requesting the content. The costs and benefits may be assessed to determine whether a net benefit is likely from communicating the prefetched object to the user system 105a. Notably, where the file size is small, as is typically the case with SMB requests, for example, the costs of communicating the prefetched objects may typically be low.

For example, the cost of forwarding the object may be determined using the following equation:

$$Cost = ObjectSize * (1.0 - ProbabilityofUse) / Bandwidth$$

The benefit of forwarding the prefetched object may be determined using the following equation:

$$Benefit = ProbabilityofUse * (RTT + PrefetchTime)$$

An illustrative cost-benefit analysis may be performed by assessing the above cost and benefit equations. If the cost value is greater than the benefit value, then the prefetched object is aborted and the object is not forwarded to the user system 105a. Conversely, if the benefit is greater than the cost, then the prefetched object is forwarded to the user system 105a. In certain embodiments, objects that have been aborted may still be cached at, for example, the server optimizer 120a, in the event that the client subsequently requests the object. Hence, the above referenced equation may be reduced to:

$$Benefit = ProbabilityofUse * RTT$$

The equation may be reduced in this manner because, since the object has already been downloaded, it would not need to be re-downloaded from the originating server.

If the prefetch is not aborted, response parser 244 forwards the response to response encoder 240. Response encoder 240 accesses coding dictionary 238 in order to encode the prefetched response. Response encoder 240 then forwards the encoded response through protocols 228 via the optimizer link 115a and to response decoder 226. Response decoder 226 decodes the response and forwards the response to response manager 224. In one embodiment, if the response is a prefetched response, then response manager 224 creates a prefetch socket to receive the prefetched item as it is downloaded. Response manager 224 transmits the response over local bus 205 to redirector 208. Redirector 208 then forwards the response to content portal 206 which renders the content of the response.

Figure 3:
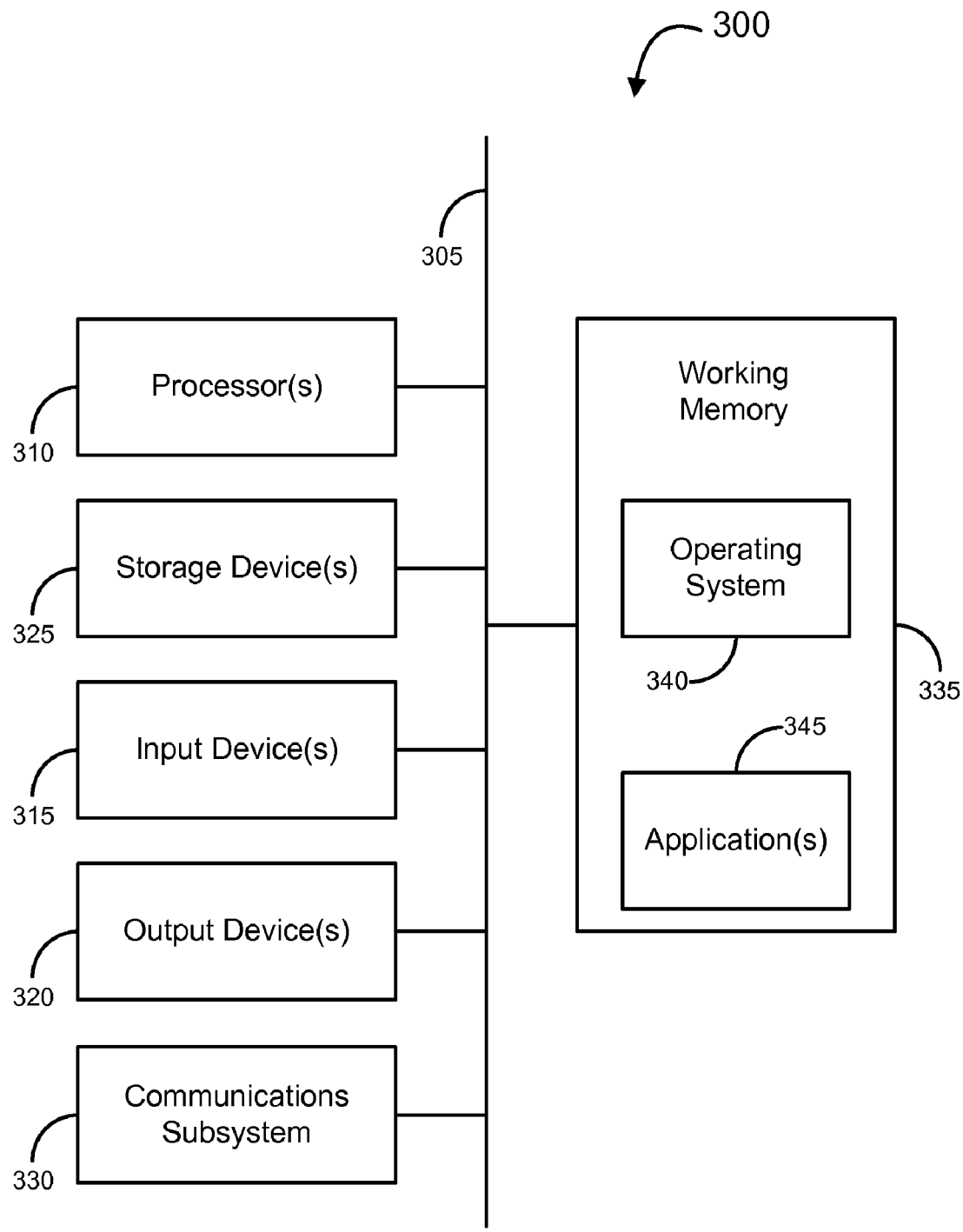
FIG. 3 provides a schematic illustration of one embodiment of a computational system for use with various embodiments.

FIG. 3 provides a schematic illustration of one embodiment of a computational system 300 that can perform the methods of the invention, as described herein, and/or can function, for example, as any part of user system 105a, client optimizer 110, server optimizer 120, content server 130, etc. of FIG. 1 or 2. It should be noted that FIG. 3 is meant only to provide a generalized illustration of various components, any or all of which may be utilized, as appropriate. FIG. 3, therefore, broadly illustrates how individual system elements may be implemented in a relatively separated or relatively more integrated manner.

The computational system 300 is shown including hardware elements that can be electrically coupled via a bus 305 (or may otherwise be in communication, as appropriate). The hardware elements can include one or more processors 310, including, without limitation, one or more general-purpose processors and/or one or more special-purpose processors (such as digital signal processing chips, graphics acceleration chips, and/or the like); one or more input devices 315, which can include, without limitation, a mouse, a keyboard, and/or the like; and one or more output devices 320, which can include, without limitation, a display device, a printer, and/or the like.

The computational system 300 may further include (and/or be in communication with) one or more storage devices 325, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like. The computational system 300 might also include a communications subsystem 330, which can include, without limitation, a modem, a network card (wireless or wired), an infra-red communication device, a wireless communication device, and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein. In many embodiments, the computational system 300 will further include a working memory 335, which can include a RAM or ROM device, as described above.

The computational system 300 also can include software elements, shown as being currently located within the working memory 335, including an operating system 340 and/or other code, such as one or more application programs 345, which may include computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 325 described above.

In some cases, the storage medium might be incorporated within a computer system, such as the computational system 300. In other embodiments, the storage medium might be separate from the computational system 300 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 300 and/or might take the form of source and/or installable code, which, upon compilation and/or installation on the computational system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computational system (such as the computational system 300) to perform methods of the invention, such as those described below. According to a set of embodiments, some or all of the procedures of such methods are performed by the computational system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer readable medium", as used herein, refer to any medium that participates in providing data that causes a machine to operate in a specific fashion. In an embodiment implemented using the computational system 300, various machine-readable media might be involved in providing instructions/code to processor(s) 310 for execution and/or might be used to store and/or carry such instructions/code (e.g., as signals). In many implementations, a computer readable medium is a physical and/or tangible storage medium.

Such a medium may take many forms, including but not limited to, non-volatile media, volatile media, and transmission media. Non-volatile media includes, for example, optical or magnetic disks, such as the storage device(s) 325. Volatile media includes, without limitation, dynamic memory, such as the working memory 335. Transmission media includes coaxial cables, copper wire, and fiber optics, including the wires that comprise the bus 305, as well as the various components of the communications subsystem 330 (and/or the media by which the communications subsystem 330 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 300. These signals, which might be in the form of electromagnetic signals, acoustic signals, optical signals, and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 310 retrieves and executes the instructions. The instructions received by the working memory 335 may optionally be stored on a storage device 325 either before or after execution by the processor(s) 310.

Figure 4:
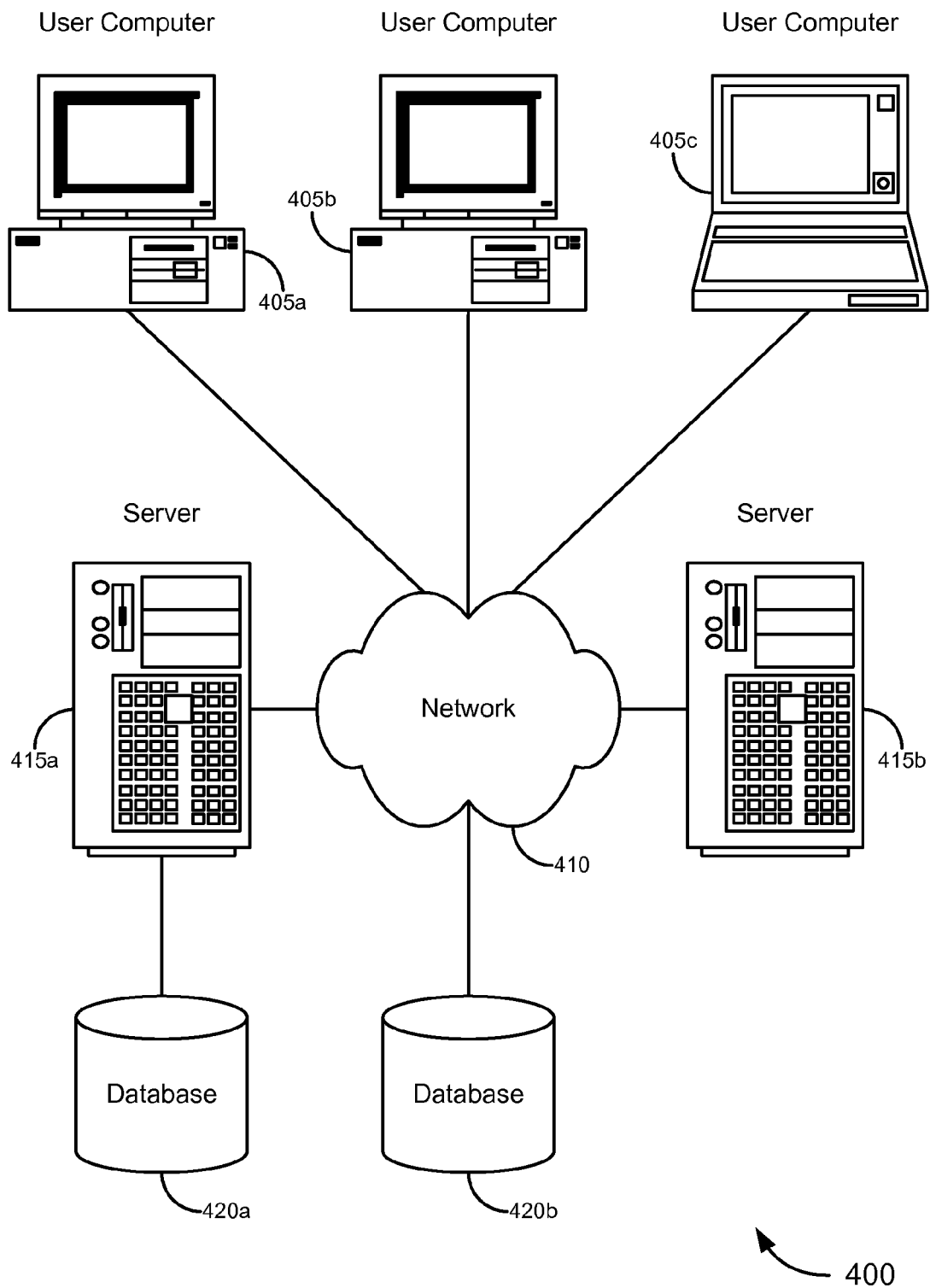
FIG. 4 illustrates a schematic diagram of a system that can be used in accordance with one set of embodiments.

A set of embodiments comprises systems for implementing staged configurator modeling. In one embodiment, the server optimizer 120 and/or the client optimizer 110 (as shown in FIG. 1 or 2) may be implemented as computational system 300 in FIG. 3. Merely by way of example, FIG. 4 illustrates a schematic diagram of a system 400 that can be used in accordance with one set of embodiments. The system 400 can include one or more user computers 405.

The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant (PDA), capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially-available protocols, including, without limitation, TCP/IP, SNA, IPX, AppleTalk, and the like. Merely by way of example, the network 410 can be a local area network ("LAN"), including, without limitation, an Ethernet network, a Token-Ring network, and/or the like; a wide-area network (WAN); a virtual network, including, without limitation, a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including, without limitation, any of those discussed above, as well as any commercially (or freely) available server operating systems. Each of the server computers 415 may also be running one or more applications, which can be configured to provide services to one or more user computers 405 and/or other server computers 415.

Merely by way of example, one of the server computers 415 may be a web server, which can be used, merely by way of example, to process requests for web pages or other electronic documents from user computers 405. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 405 to perform methods of the invention.

The server computers 415, in some embodiments, might include one or more application servers, which can include one or more applications accessible by a client running on one or more of the client computers 405 and/or other server computers 415. Merely by way of example, the server computer (s) 415 can be one or more general purpose computers capable of executing programs or scripts in response to the user computers 405 and/or other server computers 415, including, without limitation, web applications (which might, in some cases, be configured to perform methods of the invention).

Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™, and the like, which can process requests from clients (including, depending on the configurator, database clients, API clients, web browsers, etc.) running on a user computer 405 and/or another server computer 415. In some embodiments, an application server can create web pages dynamically for displaying the information in accordance with embodiments of the invention, such as information displayed on content portal 206 in FIG. 2. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more server computers 415 can function as a file server and/or can include one or more of the files (e.g., application code, data files, etc.) necessary to implement methods of the invention incorporated by an application running on a user computer 405 and/or another server computer 415. Alternatively, as those skilled in the art will appreciate, a file server can include all necessary files, allowing such an application to be invoked remotely by a user computer 405 and/or server computer 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420a might reside on a storage medium local to (and/or resident in) a server computer 415a (and/or a user computer 405). Alternatively, a database 420b can be remote from any or all of the computers 405 or server computers 415, so long as the database 420b can be in communication (e.g., via the network 410) with one or more of these. In a particular set of embodiments, a database 420 can reside in a storage-area network ("SAN") familiar to those skilled in the art. (Likewise, any necessary files for performing the functions attributed to the user computers 405 or server computers 415 can be stored locally on the respective computer and/or remotely, as appropriate.) In one set of embodiments, the database 420 can be a relational database, such as an Oracle™ database, that is adapted to store, update, and retrieve data in response to SQL-formatted commands. The database might be controlled and/or maintained by a database server, as described above, for example.

It will be appreciated that the systems described with reference to FIGS. 1-4 represent only some illustrative embodiments, and that many variations are possible without departing from the scope of those and other embodiments. Further, it will be appreciated that those and other systems can be used to implement a number of methods, including methods for using prefetch functionality to accelerate communications involving SMB requests. Embodiments of methods are described with reference to FIGS. 5-7.

Figure 5:
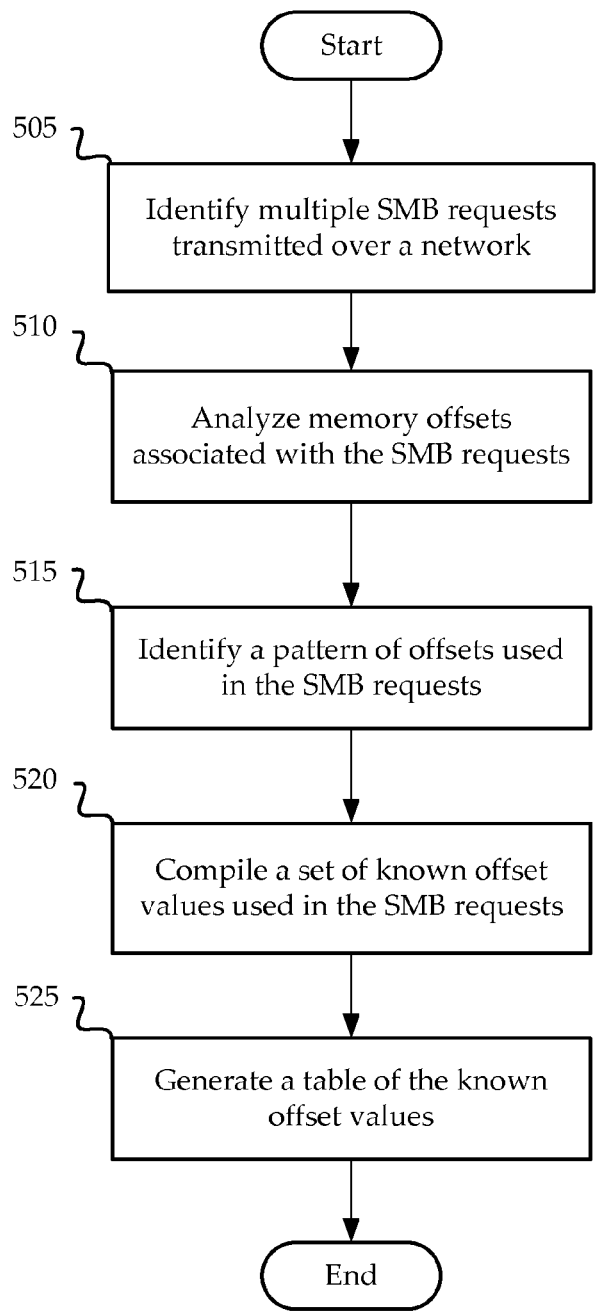
FIG. 5 shows a flow diagram of an illustrative method for identifying memory offsets for SMB Office locking requests, according to various embodiments.

Turning to FIG. 5, a flow diagram is shown of an illustrative method 500 for identifying memory offsets for SMB requests, according to various embodiments. The method 500 begins at block 505 by monitoring SMB requests as they traverse a network connection. For example, each instance an SMB request (e.g., an SMB Office™ locking request) is identified, the memory offset may be identified and stored such that it may be referenced. The network connection may be any type of connection. In some embodiments, the network connection is the optimizer link 115 of FIGS. 1 and 2.

At block 510, the identified memory offsets associated with each of the SMB requests may be analyzed in order to identify a pattern of offsets used in SMB requests. This pattern may be identified in block 515. For example, certain programs (e.g., Microsoft® Office® suite programs) may utilize a set number (e.g., 11 different offsets) of different memory offsets when executing SMB requests. In fact, in some cases, a series of twenty or more SMB requests are sent in turn, including both locking and unlocking requests for the same memory offsets.

As such, recognizing one of these offsets may indicate a high probability that others of these offsets are likely to follow. On the contrary, as yet unknown offsets may not indicate any known high-probability future request for other memory offsets. It may, therefore, be desirable to prefetch SMB requests for unrequested memory offsets when a known offset is detected, and not otherwise.

At process block 520, the identified memory offsets may be compiled based on the unique values. Then, at process block 525, a table of the known offsets may be placed into a table of known memory offsets. Accordingly, the table may be accessed by a network acceleration program to prefetch SMB requests.

Figure 6A:
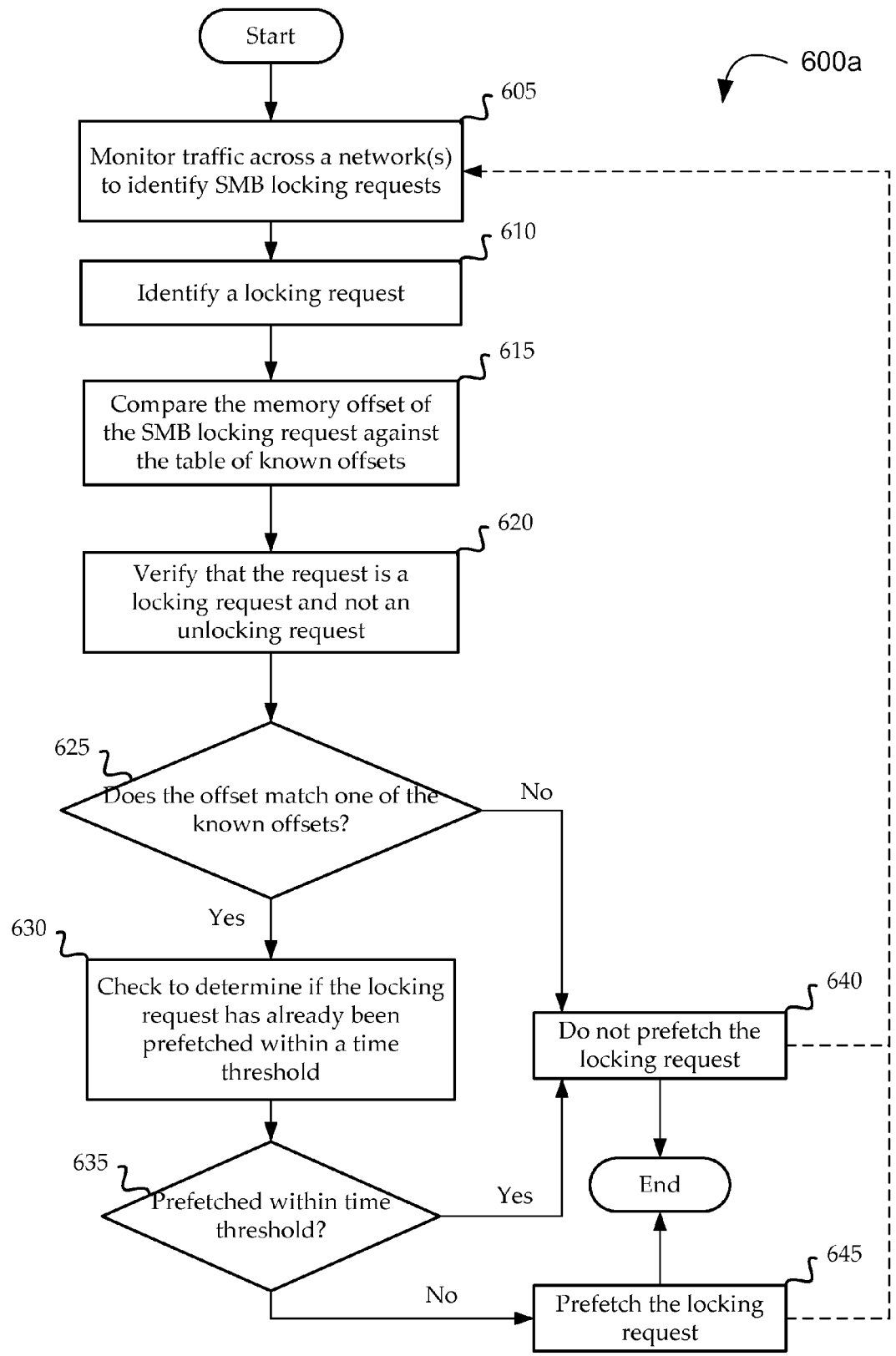
FIG. 6A shows a flow diagram of an illustrative method for implementing SMB request prefetching, according to various embodiments.

FIG. 6A shows a flow diagram of an illustrative method 600a for implementing SMB request prefetching, according to various embodiments. The method 600a begins at block 605 by monitoring network traffic to identify SMB requests. In some embodiments, the network traffic is monitored specifically for SMB locking (e.g., and/or unlocking) requests. The monitoring may involve intercepting the traffic, for example, by the server optimizer 120 of FIG. 1 or 2. In one embodiment, the acceleration may be implemented in an enterprise environment.

At some point, an SMB locking or unlocking request (or requests) is identified at block 610. Typically, the SMB locking or unlocking request is associated with one or more parameters, including a file identifier, memory offset, and a locking range. In some embodiments, when either or both of a file identifier and a memory offset are not identified by the SMB request, the SMB request is ignored, and the method 600 returns to block 605 to monitor for another SMB locking request.

In some embodiments, a command (e.g., an "NT create" command) is sent from a user to open a file server, and a file identifier may be created. Having created the file identifier, an object may be created and associated with the file identifier. This object may be used by other blocks of the method 600a. Further, in certain embodiments, a determination may be made as to whether the requested file is of a certain type. For example, embodiments may determine whether the file is associated with an application (e.g., Microsoft® Word) for which patterns of SMB request memory offsets are known.

At block 615, the memory offset of the SMB locking request is identified (e.g., parsed from the SMB request) and compared against a table of known memory offsets. For example, the table of known memory offsets may have been generated by a technique, like the one described in method 500 of FIG. 5. When the SMB request is identified, some embodiments may also identify the file identifier associated with the request, if available.

In certain embodiments, at block 620, the SMB request is verified to determine if it is an SMB locking request and not an unlocking request. If the SMB request is determined to be an SMB unlocking request, it may be assumed for the sake of certain embodiments, that a corresponding SMB lock request was previously sent and identified by a previous iteration of the method 600. In the event that the corresponding SMB locking request was previously sent, it may be likely that the identified SMB unlocking request and related known offsets were already prefetched when the corresponding SMB locking request was identified.

At block 625, a determination is made as to whether the memory offset of the SMB locking request matches any of the known memory offsets in the list of known offsets. For example, the determination may evaluate whether the associated memory offset indicates an application type for which patterns of subsequent requests can be reliably predicted. If it is determined at block 625 that the memory offset of the SMB locking request does not match any of the known memory offsets in the list of known offsets (i.e., no match is found), the method 600a may terminate without prefetching at block 640 (e.g., or return to block 605 for further monitoring).

If it is determined at block 625 that the memory offset of the SMB locking request matches one of the known memory offsets in the list of known offsets (i.e., a match is found), a check is made to determine if the identified SMB locking request has already been prefetched within a certain time period threshold at block 630. In one embodiment, the threshold is 10 seconds; however, other time periods may be used. This may improve the prefetching efficiency by reducing overly redundant prefetching requests.

At block 635, for each memory offset associated with the requested memory offset in the list of known offsets, a determination is made as to whether a prefetch request for that memory offset was issued (e.g., whether a prefetch request was made by the server optimizer 120, whether a prefetch response was received at the server optimizer 120, and/or whether a prefetched object was communicated to the user system 105) within the predetermined time threshold. If it is determined at block 635 that a prefetch request for that memory offset was issued within the predetermined time threshold, embodiments of the method 600a may terminate without prefetching at block 640 (e.g., or return to block 605 for further monitoring).

For example, suppose that an SMB locking request is identified at block 610 that has a known memory offset "A," according to blocks 615 and 625. According to the table of known offsets, it is determined to be likely that SMB requests will subsequently be made for memory offsets "B," "C," "D," and "E." SMB locking and unlocking requests are prefetched for these memory offsets prior to receiving any actual SMB requests for those memory offsets. Shortly thereafter, an SMB request is received for memory offset "B," and the table of known offsets predicts subsequent SMB requests for "C," "D," and "E." Because locking and unlocking requests were just prefetched for "C," "D," and "E" in the context of receiving the SMB request for "A," it may be undesirable to prefetch SMB requests for these memory offsets again. As such, it may be undesirable to prefetch SMB requests for these memory offsets again in the context of "B," for example, as indicated by block 640.

If it is determined at block 635 that a prefetch request for that memory offset was not issued within the predetermined time threshold, embodiments of the method 600 may prefetch SMB locking and unlocking requests for that memory offset at block 645. For example, exceeding the time threshold may suggest a greater likelihood of staleness. The time threshold may indicate a validity of a lock associated with the SMB request. For example, if the identified SMB locking request was prefetched 6 hours ago, the lock may be out of date (e.g., not "fresh"), which may increase a probability that the lock is no longer valid. Accordingly, it may be desirable to prefetch the SMB locking request again at block 645, even though it had been previously prefetched.

Figure 6B:
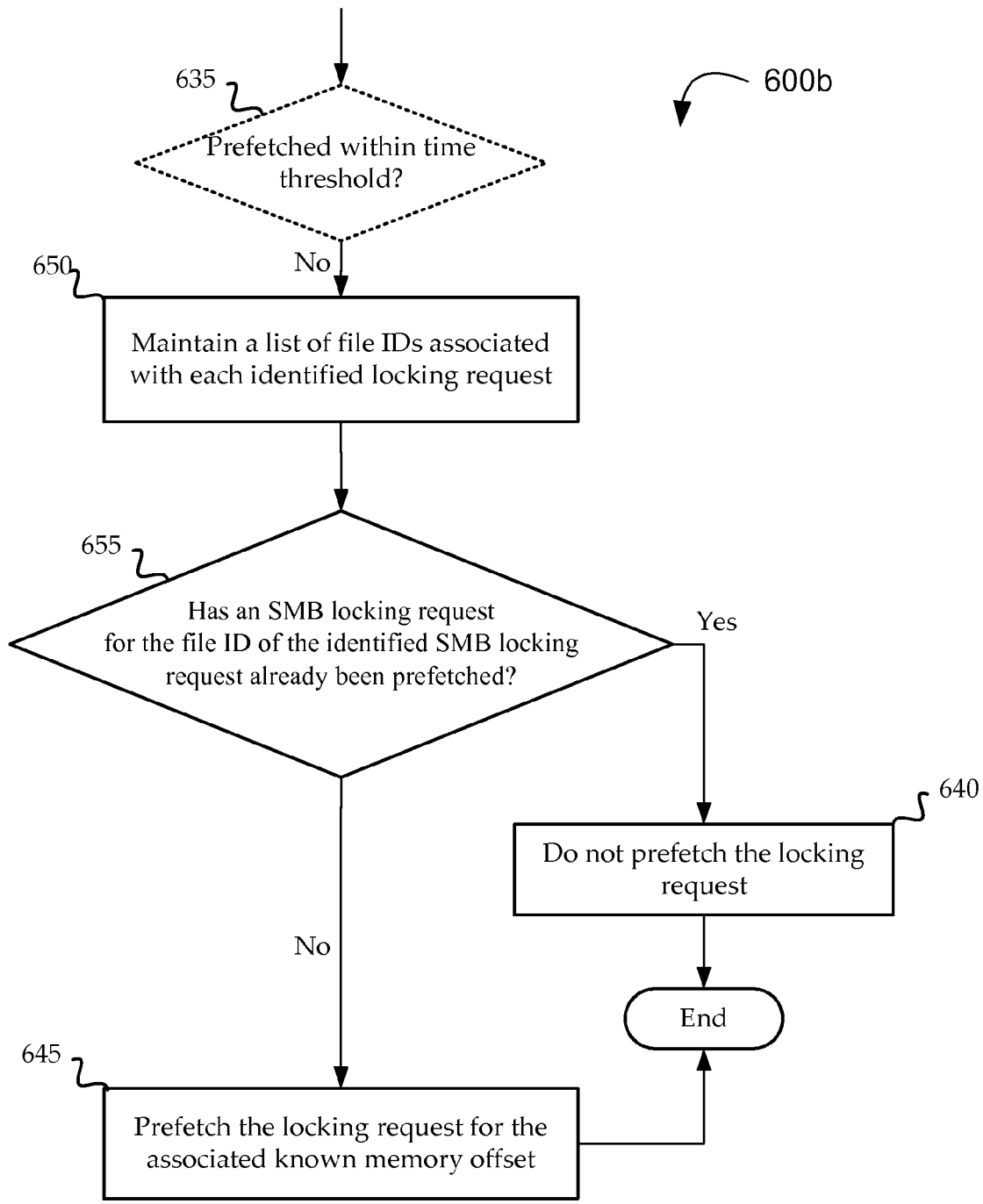
FIG. 6B shows a flow diagram of an illustrative additional partial method in the context of the method of FIG. 6A.

In some embodiments, additional determinations are made to further optimize the prefetching of SMB requests. For example, FIG. 6B, shows a flow diagram of an illustrative additional partial method 600b in the context of the method 600a of FIG. 6A. The method 600b is illustrated as beginning at block 635 of FIG. 6A, when it is determined that a prefetch request for that memory offset was not issued within the predetermined time threshold. Rather than automatically prefetching, however, additional determinations are made.

At block 650, a list of file identifiers for each of the files for which SMB locking requests have been prefetched is stored. For example, the list may be maintained in order to avoid redundant prefetching of SMB locking requests for file identifiers. Further, the list may help to ensure that SMB request determinations are not being confused across different file identifiers. For example, the SMB locking and unlocking requests may look substantially identical for similar file transactions using different files from the same application (except for the file identifier designation). Failure to track file identifiers may yield undesirable results. For example, an unlocking request may be handled as if it corresponds with a particular locking request for the same memory offset, though the two requests actually refer to different files with different file identifiers.

At block 655, a determination is made as to whether an SMB locking request for the file ID of the identified SMB locking request has already been prefetched. If it is determined at block 655 that an SMB locking request for the file ID of the identified SMB locking request has already been prefetched, embodiments of the method 600b may terminate without prefetching at block 640 (e.g., or return to block 605 of FIG. 6A for further monitoring). If it is determined at block 655 that an SMB locking request for the file ID of the identified SMB locking request has not already been prefetched (e.g., at least within some time period), embodiments of the method 600b may prefetch at block 645. After prefetching, the method 600b may terminate or return to block 605 of FIG. 6A for further monitoring.

According to some embodiments, if it is determined at block 655 that an SMB locking request for the file ID of the identified SMB locking request has not already been prefetched, other determinations are made. For example, in certain embodiments, a determination is made as to whether the current time minus the last time prefetching failed is less than a locking failure threshold. If the current time minus the last time prefetching failed is less than a locking failure threshold, the method 600b may not prefetch, as this condition may indicate that the user attempting to lock the file does not have sufficient rights to lock the file, that the file may have already been locked by another user or programs, etc. However, if the locking request is a success, the identified SMB locking request is prefetched for the known memory offset and the associated file ID at block 645.

Figure 7:
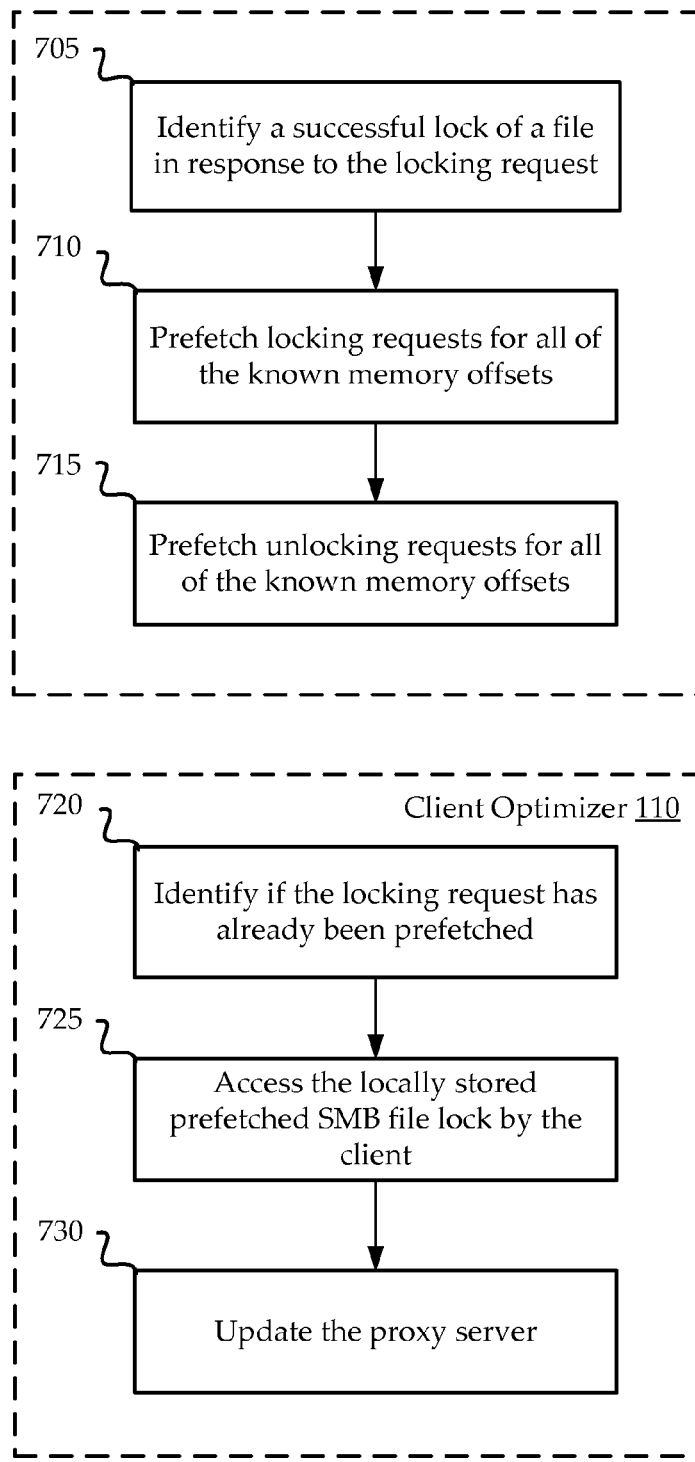
FIG. 7 shows a flow diagram of an illustrative method for implementing SMB locking request prefetching in the context of a client optimizer and a server optimizer, according to various embodiments.

FIG. 7 shows a flow diagram of an illustrative method 700 for implementing SMB locking request prefetching in the context of a client optimizer 110 and a server optimizer 120, according to various embodiments. The method 700 begins at block 705 when the server optimizer 120 identifies the successful lock of a file in response to the locking request. Accordingly, the server optimizer 120 (through, for example, its prefetcher) may prefetch locking requests for all of the known memory offsets at block 710, and the server optimizer 120 may prefetch unlocking requests for all of the known memory offsets at block 715. As such, any subsequent SMB locking requests for the file ID may be prefetched, thus potentially saving valuable RTTs.

Turning to the client optimizer 110 side, at block 720, the client optimizer 110 may identify that the locking request has already been prefetched and is thus being stored locally on the user system (e.g., user system 105 of FIG. 1 or 2). At block 725, if the SMB locking request is already stored locally, at the client, then the locally stored SMB locking request is accessed by the client as opposed to receiving the locking request from the server optimizer 120 or file server (e.g., content server 130). Furthermore, the client optimizer 110 may then send an update to the server optimizer 120, for example, to maintain synchronization of the file locks at block 730.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium, and is not to be limited to any particular type of memory or number of memories or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels, and/or various other storage mediums capable of storing that contain or carry instruction(s) and/or data.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the principles of the disclosure have been described above in connection with specific apparatuses and methods, it is to be clearly understood that this description is made only by way of example and not as limitation on the scope of the disclosure.

What is claimed is:

1. A method for implementing simple message block (SMB) request prefetching, the method comprising:
   monitoring, at an optimizer node of a communications system, network traffic to identify an SMB request, the network traffic comprising communications from a user system on a client side of the communications system to an addressable content location on a server side of the communications system, the optimizer node being disposed in the communications system between the user system and the content location; and
   when a first SMB request is identified:
      analyzing the first SMB request to determine an associated request memory offset indicating a memory offset within a file affected by the first SMB request;
      determining whether the request memory offset matches one of a set of known memory offsets maintained by the optimizer node, each of the set of known memory offsets being associated with at least one additional memory offset previously determined as likely to be associated with a second SMB request requested by the user system within a first time threshold subsequent to the first SMB request;
      determine whether the first SMB request is an SMB locking request or an SMB unlocking request; and
      when the request memory offset matches one of the set of known memory offsets maintained by the optimizer node, prefetching an SMB locking request and an SMB unlocking request, both associated with the at least one additional memory offset;
      wherein the prefetching step occurs only when the first SMB request is an SMB locking request.

2. The method of claim 1, wherein monitoring the network traffic to identify an SMB request comprises monitoring the network traffic only to identify either an SMB locking request or an SMB unlocking request.

3. The method of claim 1, further comprising:
   identifying a third SMB request as an SMB request prefetched in association with the request memory offset at a prefetch time prior to a request time associated with identifying the first SMB request; and
   determining whether a difference between the request time and the prefetch time exceeds a second time threshold, wherein the prefetching step occurs only when the difference between the request time and the prefetch time exceeds the second time threshold.

4. The method of claim 3, further comprising:
maintaining a list of file identifiers associated with previously prefetched SMB requests; and
analyzing the first SMB request to determine an associated request file identifier indicating the file affected by the first SMB request,
wherein identifying the third SMB request comprises identifying the third SMB request as an SMB request prefetched in association with the request memory offset and further in association with the request file identifier at the prefetch time prior to the request time associated with identifying the first SMB request.

5. The method of claim 3, further comprising:
determining whether the third SMB request is stale,
wherein the prefetching step occurs only when the difference between the request time and the prefetch time exceeds the second time threshold and the third SMB request is stale.

6. The method of claim 3, further comprising:
wherein the second time threshold is ten seconds.

7. The method of claim 1, further comprising:
monitoring, at the optimizer node of the communications system, the network traffic to identify a set of subsequent SMB requests originating from the user system within a second time threshold subsequent to the identifying the first SMB request; and
updating the set of known memory offsets by associating the request memory offset of the first SMB request with the at least one additional memory offset corresponding to the set of subsequent SMB requests.

8. The method of claim 1, wherein the optimizer node is implemented as a proxy server on the server side of the communications system.

9. The method of claim 1, wherein the content location is a file server.

10. A system for implementing simple message block (SMB) request prefetching, the system comprising:
at least one hardware element;
a traffic monitoring subsystem disposed at an optimizer node of a communications system between a user system and a content server and configured to monitor network traffic to identify an SMB request, the network traffic comprising communications from a user system on the client side to a content server on the server side;
a traffic analyzer subsystem, communicatively coupled with the optimizer node, and configured, when a first SMB request is identified, to:
analyze the first SMB request to determine an associated request memory offset indicating a memory offset within a file affected by the first SMB request;
determine whether the request memory offset matches one of a set of known memory offsets maintained by the optimizer node, each of the set of known memory offsets being associated with at least one additional memory offset previously determined as likely to be associated with a second SMB request requested by the user system within a first time threshold subsequent to the first SMB request; and
determine whether the first SMB request is an SMB locking request or an SMB unlocking request; and
a prefetching subsystem, communicatively coupled with the traffic analyzer subsystem, and configured to:
prefetch an SMB locking request and an SMB unlocking request, both associated with the at least one additional memory offset, when the request memory offset matches one of the set of known memory offsets maintained by the optimizer node; and
prefetch the SMB locking request and the SMB unlocking request associated with the at least one additional memory offset only when the first SMB request is an SMB locking request.

11. The system of claim 10, wherein the traffic monitoring subsystem is configured to monitor the network traffic to identify only either an SMB locking request or an SMB unlocking request.

12. The system of claim 10, wherein:
the traffic analyzer subsystem is further configured to:
identify a third SMB request as an SMB request prefetched in association with the request memory offset at a prefetch time prior to a request time associated with identifying the first SMB request; and
determine whether a difference between the request time and the prefetch time exceeds a second time threshold; and
the prefetching subsystem is configured to prefetch the SMB locking request and the SMB unlocking request associated with the at least one additional memory offset only when the difference between the request time and the prefetch time exceeds the second time threshold.

13. The system of claim 12, wherein the traffic analyzer subsystem is further configured to:
maintain a list of file identifiers associated with previously prefetched SMB requests;
analyze the first SMB request to determine an associated request file identifier indicating the file affected by the first SMB request; and
identify the third SMB request as an SMB request prefetched in association with the request memory offset and further in association with the request file identifier at the prefetch time prior to the request time associated with identifying the first SMB request.

14. The system of claim 10, wherein the traffic analyzer subsystem is further configured to:
monitor, at the optimizer node of the communications system, the network traffic to identify a set of subsequent SMB requests originating from the user system within a second time threshold subsequent to the identifying the first SMB request; and
update the set of known memory offsets by associating the request memory offset of the first SMB request with the at least one additional memory offset corresponding to the set of subsequent SMB requests.

15. A non-transitory machine-readable medium having stored thereon a series of instructions which, when executed by a processor, cause the processor to implement simple message block (SMB) request prefetching according to steps comprising:
monitoring, at an optimizer node of a communications system, network traffic to identify either an SMB locking request or an SMB unlocking request, the network traffic comprising communications from a user system on a client side of the communications system to an addressable content location on a server side of the communications system, the optimizer node being disposed in the communications system between the user system and the content location; and
when a first SMB request is identified:
analyzing the first SMB request to determine an associated request memory offset indicating a memory offset within a file affected by the first SMB request;

determining whether the request memory offset matches one of a set of known memory offsets maintained by the optimizer node, each of the set of known memory offsets being associated with at least one additional memory offset previously determined as likely to be associated with a second SMB request requested by the user system within a first time threshold subsequent to the first SMB request;

determine whether the first SMB request is an SMB locking request or an SMB unlocking request; and when the request memory offset matches one of the set of known memory offsets maintained by the optimizer node, prefetching an SMB locking request and an SMB unlocking request, both associated with the at least one additional memory offset;

wherein the prefetching step occurs only when the first SMB request is an SMB locking request.

16. The machine-readable medium of claim 15, wherein the prefetching step occurs only when the first SMB request is identified as an SMB locking request.

17. The machine-readable medium of claim 15, wherein the series of instructions, when executed by a processor, cause the processor to implement simple message block (SMB) request prefetching according to steps further comprising:

identifying a third SMB request as an SMB request prefetched in association with the request memory offset at a prefetch time prior to a request time associated with identifying the first SMB request; and determining whether a difference between the request time and the prefetch time exceeds a second time threshold, wherein the prefetching step occurs only when the difference between the request time and the prefetch time exceeds the second time threshold.

18. The machine-readable medium of claim 17, wherein the series of instructions, when executed by a processor, cause the processor to implement simple message block (SMB) request prefetching according to steps further comprising:

maintaining a list of file identifiers associated with previously prefetched SMB requests; and analyzing the first SMB request to determine an associated request file identifier indicating the file affected by the first SMB request, wherein identifying the third SMB request comprises identifying the third SMB request as an SMB request prefetched in association with the request memory offset and further in association with the request file identifier at the prefetch time prior to the request time associated with identifying the first SMB request.

* * * * *